UNITED STATES PATENT OFFICE.

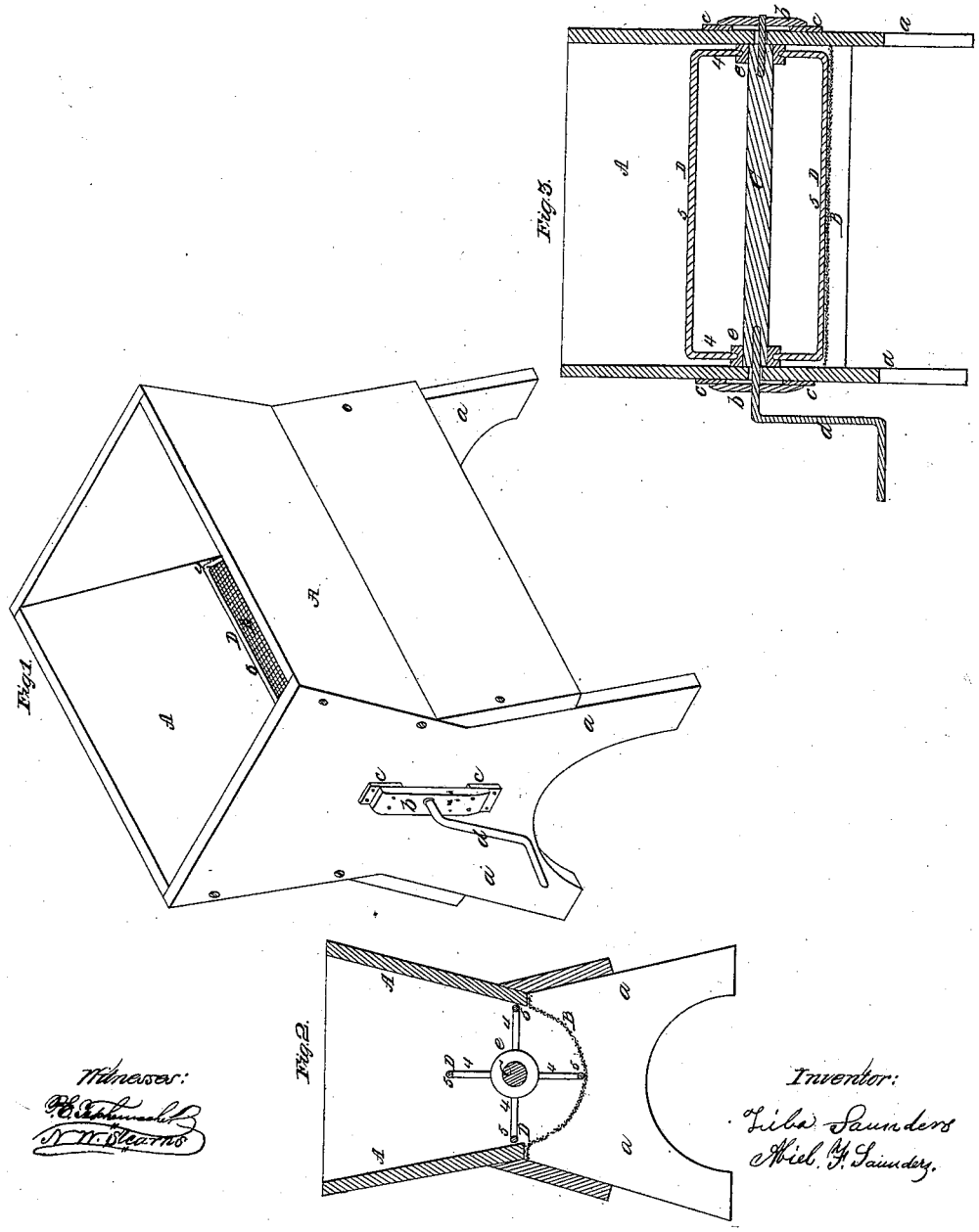

ZIBA SAUNDERS, OF TEWKESBURY, AND ABIEL F. SAUNDERS, OF BOSTON, MASSACHUSETTS.

FLOUR-SIFTER.

Specification forming part of Letters Patent No. 50,847, dated November 7, 1865.

*To all whom it may concern:*

Be it known that we, ZIBA SAUNDERS, of Tewkesbury, in the county of Middlesex and State of Massachusetts, and ABIEL F. SAUNDERS, of Boston, in the county of Suffolk and State aforesaid, have invented a new and Improved Flour-Sifter, of which the following is a full, clear, and exact description, reference being had to the accompanying drawings, making part of this specification, in which—

Figure 1 is a perspective view of my improved sifter. Fig. 2 is a vertical transverse section through the center of the same. Fig. 3 is a longitudinal vertical section through the center of the same.

That class of flour-sifters now in general use where the flour is rubbed over a sieve by means of a revolving shaft provided with flanges, projections, or similar devices are objectionable, as any impurities which may be in the flour are liable to be mashed or ground up and carried through the sieve, while the shaft is frequently prevented from revolving, and the sieve itself is broken by nails and other hard substances; and there is also a liability of the flour adhering to the flanges or projections and gradually filling up and clogging the space between them and their shaft.

The object of our invention is to remove the above-mentioned difficulties; and it consists in a shaft provided with a series of longitudinal rods or beaters revolving in elastic or yielding bearings attached to the sides of the box or hopper.

To enable others skilled in the art to understand and use our invention, we will proceed to describe the manner in which we have carried it out.

In the said drawings, A is a box or hopper, which is supported on legs *a*, and has attached to its lower end a sieve, B, of a curved form, as seen in Fig. 2.

C is a shaft, the extremities of the axis of which pass through open slots in the side of the box A, and have their bearings in plates *b*, attached to the outside by means of rubber or other elastic strips, *c*. One end of the axis of the shaft projects beyond its bearings in the plates *b*, and is bent to form a crank or handle, *d*, by which the shaft is revolved. At opposite ends of the shaft C, within the box A, are formed the circular projections *e*, into which are secured the bent ends 4 of a series of rods or beaters, D, the longitudinal portion 5 of each forming about a right angle with its bent end 4, and rubbing in contact with the sieve B as the shaft C is revolved. The rods or beaters D being round and of a small diameter, and the flour being agitated and constantly rubbed by them over the bottom of the sieve B, there is no possibility of the flour clogging the space between them and the shaft C, the lumps passing or being rolled over the beaters as they revolve.

In the event of any obstruction being forced under one of the beaters and wedged between it and the sieve B, the axis of the shaft is pressed upward in its yielding bearings, and may continue to revolve without injury to the sieve.

A flour-sifter constructed as above described performs its work in a rapid and effectual manner, and may be furnished at a small cost.

What we claim as our invention, and desire to secure by Letters Patent, as an improvement in flour-sifters, is—

The revolving shaft C, carrying a series of rods or beaters, D, in combination with a yielding bearing, *b*, constructed and operating substantially as described.

ZIBA SAUNDERS.
ABIEL F. SAUNDERS.

Witnesses:
P. E. TESCHEMACHER,
N. W. STEARNS.